United States Patent [19]

Speich

[11] Patent Number: 4,518,020
[45] Date of Patent: May 21, 1985

[54] DRIVE ASSEMBLY FOR PRODUCING A NONUNIFORM OUTPUT FROM A UNIFORM INPUT

[75] Inventor: Francisco Speich, Gipf-Oberfrick, Switzerland

[73] Assignee: Textilma AG, Hergiswil, Switzerland

[21] Appl. No.: 544,613

[22] Filed: Oct. 24, 1983

[30] Foreign Application Priority Data

Oct. 26, 1982 [CH] Switzerland .................. 6251/82

[51] Int. Cl.³ ................. D03C 13/00; F16H 35/02
[52] U.S. Cl. ................. 139/55.1; 139/76; 74/394; 74/802
[58] Field of Search ............ 139/55.1, 76; 74/394, 74/393, 802

[56] References Cited

U.S. PATENT DOCUMENTS 3,173,525 3/1965 Hergert ........................ 74/394
4,393,902 7/1983 Brock ......................... 139/76

FOREIGN PATENT DOCUMENTS

1933721 6/1971 Fed. Rep. of Germany ..... 139/55.1
3108576 7/1982 Fed. Rep. of Germany ..... 139/55.1

Primary Examiner—Henry S. Jaudon
Assistant Examiner—S. Shongut
Attorney, Agent, or Firm—Toren, McGeady & Stanger

[57] ABSTRACT

A drive assembly or gear unit is formed with a drive unit which is rotatably supported on a power output shaft between two bearing positions on the output shaft. The drive unit includes a pair of crankshafts which are offset relative to each other by 180°, with each of the crankshafts carrying planet wheels which mesh with a stationary sun gear. The crankshafts are formed with cranks which cooperate with the arms of a twin-armed rocker member which is rotatably affixed to the output shaft in order to apply driving force thereto.

7 Claims, 10 Drawing Figures

DRIVE ASSEMBLY FOR PRODUCING A NONUNIFORM OUTPUT FROM A UNIFORM INPUT

The present invention relates generally to drive assemblies and more particularly to a drive assembly which is adapted to produce a nonuniform output from a uniform input.

Mechanisms of the type to which the present invention relates are particularly for suitable for use with the shedding mechanisms of a weaving machine, especially a ribbon weaving machine.

Usually, in such drive assemblies, planetary gear means are provided and a crankshaft is connected with a rocker mechanism which operates to drive the output shaft.

A gear unit of the type to which the present invention relates is known, for example, in the prior art from DE-OS No. 31 08 576. In a gear unit of the type described therein, the crank of the crankshaft is connected with a coupling or clutch member which is articulated at a swing arm, which is in turn nonrotatably connected with the output or power takeoff shaft. Such a gear unit has a rather simple, low-wear and low-play construction, but it does not provide the possibility for adjusting the amount of play involved. Moreover, relatively wide fluctuations in the maximum and minimum positions of movement and in certain distortions in the movement curve relative to the drive shaft result in the movement characteristics of the power takeoff shaft and this may produce disadvantages particularly in high-powered weaving machines or looms.

In the prior art, particularly in DE-AS No. 19 33 721, there is described a gear unit which is adaptable for various fields of use other than the textile industry, such as in materials handling technology, packaging technology, printing, as well as in mixing and kneading machines, and this gear unit is formed with a rotatable drive member on a freely supporting axle, which drive member carries shafts at positions which are offset by 180°. At the shafts there are provided fixed planetary gear wheels arranged in an overhung manner. On one side, the planet wheels are driven by a sun wheel or gear arranged at an overhung driveshaft and on the other side, the planet wheels mesh with a sun wheel arranged at the housing so as to be held stationary. The planet wheels of one side contain crank pins which are either connected by guide rods or connecting rods with a twin-armed rocker or which engage by means of slide blocks in the slots of the arms of the two-armed rocker, which arms are constructed with a forked configuration.

The twin-armed rocker is in turn arranged so as to be overhung at a power takeoff shaft which is supported so as itself to be overhung. By means of the doubled arrangement of the shafts with the planet wheels and the crank pins as well as the twin-armed rocker, a balance of mass of the moving parts is achieved which produces a positive effect on the mechanism. However, this positive effect is canceled due to the multifold overhung arrangement of the parts, since the overhung arrangement leads to a limitation of the forces which are to be transmitted, it causes wear and accordingly also produces a higher level of noise. This applies particularly to the slide block guide in the forked arms of the twin-armed rocker. It cannot be derived from the prior art mentioned above that the known gear unit is capable of providing particularly advantageous sloped maximum and minimum movement characteristics as well as distortion-free movement relative to the drive shaft which could be suitable for the textile industry particularly for the shedding mechanism of a powered weaving machine.

Accordingly, the present invention is directed toward provision of a gearing unit or drive assembly of the type discussed above which operates in such a manner that the movement characteristic of the power takeoff shaft will have relatively sloped maximum and minimum characteristics as well as a uniform progression and that an improved mass balance is achieved.

SUMMARY OF THE INVENTION

Briefly, the present invention may be described as a gear unit or drive assembly for producing a nonuniform power output from a uniform input drive, particularly adapted for use for a shedding mechanism of a weaving machine comprising a drive member having a relatively uniform power input, an output shaft driven by said drive member, a pair of crankshafts offset relative to each other by 180° connected to be driven by said drive member, a pair of journals supported at two bearing positions on said output shaft and having said crankshafts supported therein, a planet wheel mounted on each of said crankshafts, a stationary sun gear arranged with said planet wheels in meshing engagement therewith, and a twin-armed rocker connected to be driven by said crankshaft for driving said output shaft.

In a gear unit in accordance with the present invention, it has been found that initially a peaked or acute maximum and minimum characteristic curve, as well as a movement characteristic having uniform progressions, can be achieved at the power takeoff or output shaft when the crankshaft is not connected by means of the coupling member with the rocker but engages directly with the latter and when a second crank arranged at the drive member so as to be offset by 180° relative to the first crank is employed for this purpose, with the second crank engaging at or acting on the second arm of the twin-armed rocker. Such an arrangement is found to be very advantageous particularly for setting mechanisms for weaving machines. Moreover, the doubled arrangement of the crankshafts offset by 180° makes possible the transmission of greater forces and a good mass balance. Additionally, this construction of the gear unit permits the arms of the rocker to be pretensioned against the cranks so that the gear unit may be constructed free of play. In connection with the improved mass balance, a smoother and less noisy operation is possible and the movement characteristics may be achieved even at higher revolutions.

The various features of novelty which characterize the invention are pointed out with particularity in the claims annexed to and forming a part of this disclosure. For a better understanding of the invention, its operating advantages and specific objects attained by its use, reference is made to the accompanying drawings and descriptive matter in which there is illustrated and described a preferred embodiment of the invention.

DETAILED DESCRIPTION OF THE PREFERRED EMBODIMENT

Figure 1:
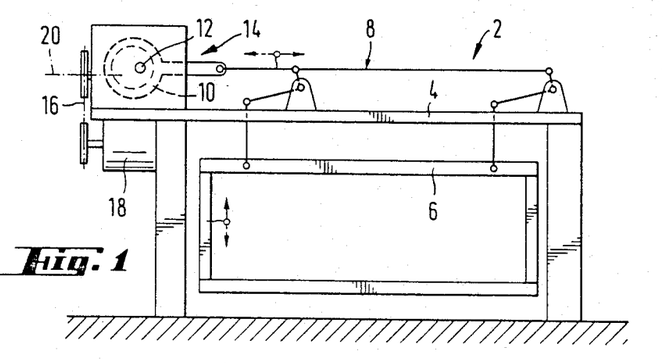
FIG. 1 is a schematic diagram showing the arrangement of a gear unit for driving a shedding mechanism of a weaving machine.

Referring now to the drawings wherein like reference numerals are used to refer to similar parts in the various figures thereof, and referring more particularly to FIG. 1 wherein there is shown a shedding mechanism 2 of a weaving machine wherein a gear unit or drive assembly in accordance with the present invention is utilized, the mechanism includes a frame 4 wherein there are arranged shaft frames 6 which are held and actuated by shaft raising elements or tensioning elements 8. The shaft raising or tensioning elements 8 are in turn connected with eccentrics 10 which are arranged upon a shaft 12.

Figure 2:
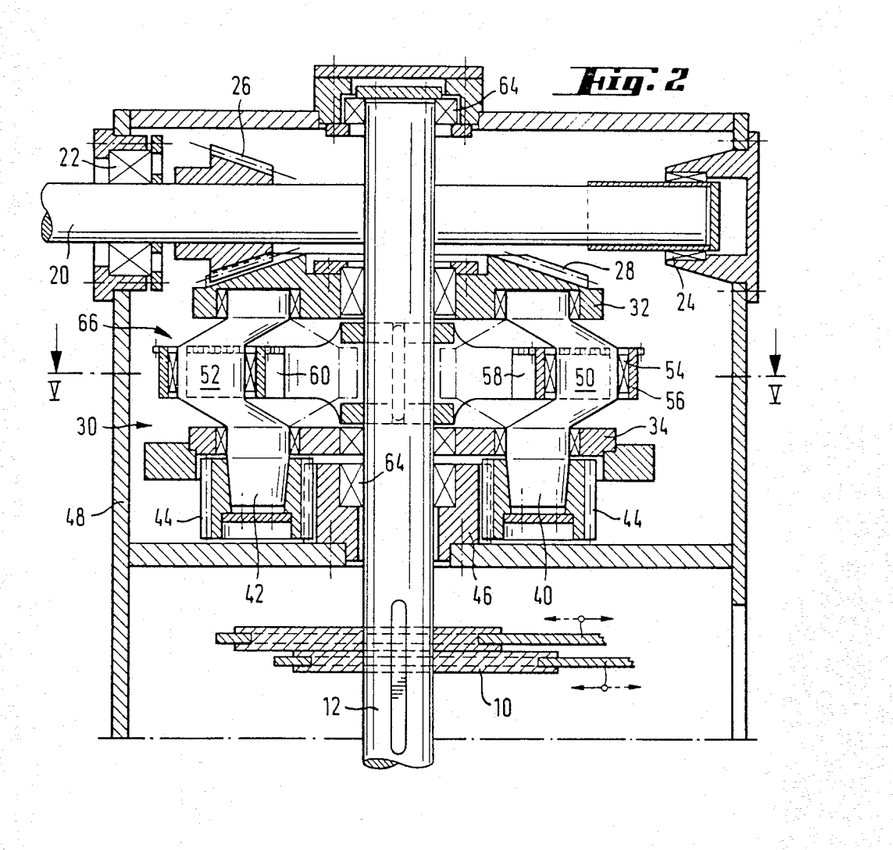
FIG. 2 is a sectional view of the gear unit of the invention taken along the line II—II of FIG. 5.

The shaft 12 is essentially the power takeoff or output shaft of a gear unit 14 which is structured in accordance with the present invention and which is shown in greater detail in FIG. 2 which operates to drive the shedding mechanism 2. The gear unit 14 is driven by a chain drive 16 through a motor 18 or by another drive shaft of the weaving machine.

The gear unit of the invention is shown in greater detail in FIGS. 2-8. The unit is arranged to apply nonuniform power to the output or power takeoff shaft 12 and power input is applied to the gear unit at a drive shaft 20 which is driven by the chain drive 16, with the driveshaft 20 being arranged to be offset relative to the output shaft 12. The driveshaft 20 is supported at two points by bearings 22 and 24 and it carries a bevel pinion 26 which is arranged in meshing engagement with a bevel gear 28 which is arranged laterally relative to the shaft 20.

The mechanism whereby power is transmitted from the shaft 20 to the output shaft 12 is generally identified by the reference numeral 30 and this drive mechanism 30 is constructed in a cage-like manner and includes a pair of journals or cheeks 32, 34 which are connected with one another on one side by means of a web 36 which is constructed as a balance weight. On the other side, the journals or cheeks 32, 34 are connected by means of a bolt or pin 38. The journals 32, 34 are rotatably supported on the output shaft 12. Between the web 36 and the bolt 38, the journals 32, 34 carry a pair of crankshafts 40, 42 with the crankshafts being offset relative to each other by 180°. The crankshafts 40, 42 are connected in each case with a planet wheel 44 located outside of the drive mechanism 30. The planet wheels 44 cooperate with a sun gear 46 which is arranged in a housing 48 so as to be maintained stationary.

The crankshafts 40, 42 are each supported at opposite ends thereof in the journals 32, 34 and they are formed with cranks 50, 52 which swing counter to each other and at which there are arranged bearing rings 56 with roller bearings 54. Each of the cranks 50, 52 cooperates in each instance through the bearing rings 56 with an arm 58, 60 of a twin-armed rocker member 62 which is nonrotatively connected with the output shaft 12. The output shaft 12 is supported on both sides of the drive mechanism 30 in bearings 64 of the housing 48.

Each of the arms 58, 60 of the rocker member 62 includes means 66 which prevent the bearing rings 56 from slipping through during the change in the running direction of the bearing rings 56 on the arms 58, 60. For this purpose, the bearing rings 56 are formed with toothed rings or rims 68 which mesh with toothed racks 70 on the arms 58, 60.

Additionally, the gear unit includes means 72 for adjusting the play between the cranks 50, 52 and the rocker member 62. The means 72 for play adjustment contains a regulating mechanism 74 for adjusting the distance of the arms 58, 60 with reference to the crankshafts 40, 42. For this purpose, the arms 58, 60 have running blocks 76 for the bearing rings 56 of the cranks 50, 52 and the running blocks 76 are fastened by means of screws to the arms 58, 60. By means of exchangeable packing plates or shims 78, the distances of the bearing blocks 76 with reference to the cranks 50, 52 can be adjusted in such a manner that no play will exist.

In the present embodiment of the invention, the planetary gear unit is constructed as a spur wheel gear unit having an externally toothed sun wheel 46. However, it would also be possible to construct the planet gear unit differently, for example it may be provided with a sun wheel which is internally toothed. Planet gear units on the basis of chain gear units and toothed wheel gear units are also possible. The planetary gear unit preferably contains a transmission ratio of planet wheel to sun wheel which is 1:2. This means that the power takeoff velocity is superposed with two oscillations on an additional incremental velocity, such as is shown in FIGS. 9 and 10 for the transmission ratio of 1:2.

Figure 3:
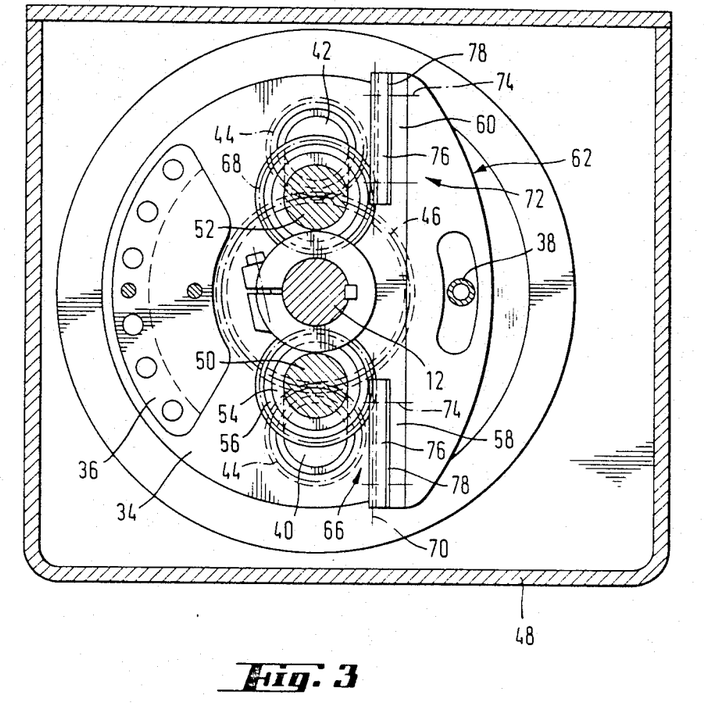
FIGS. 3-7 are sectional views taken through the cranks of the crankshafts of the mechanism of FIG. 2 showing the mechanism in various operating positions.
Figure 4:
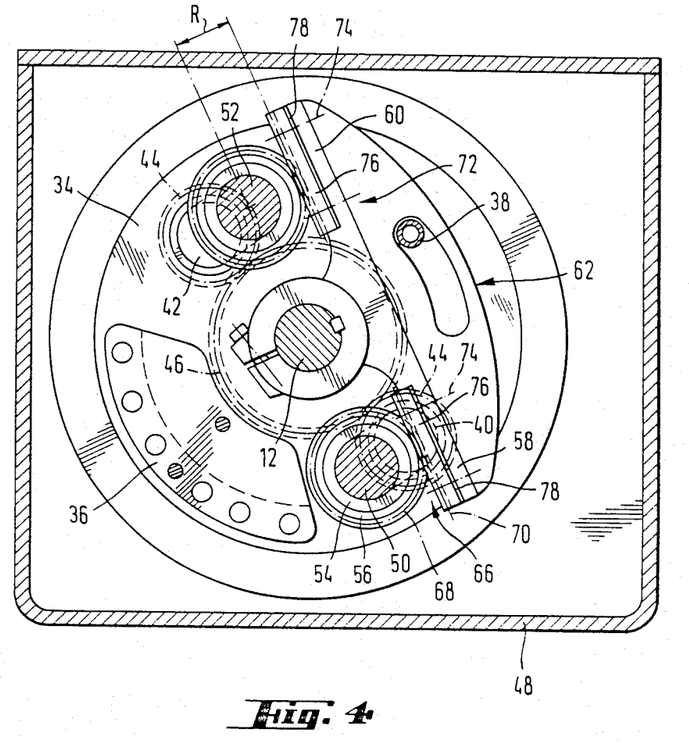

As already previously indicated herein, an additional velocity is superposed on the power takeoff velocity of the output shaft by means of the crankshafts 40, 42 which are driven by means of the planet gear units 44, 46, which additional velocity is sometimes positive and sometimes negative and can lead up to a temporary stoppage of the output shaft 12 according to the size of the crank radius, as follows from the graph of FIG. 9. The movement phase of the drive mechanism 30 as seen in FIG. 3 corresponds to the position of the angle of rotation 0° to 360°, respectively, in the diagrams of FIGS. 9 and 10 inasmuch as the greatest oppositely directed movement is produced in this position. The movement phase of the drive mechanism 30 as seen in FIG. 4 corresponds to the angular position of rotation of 45° since the angular velocity of the drive mechanism 30 is equal to the angular velocity of the output shaft 12 during this phase.

Figure 5:
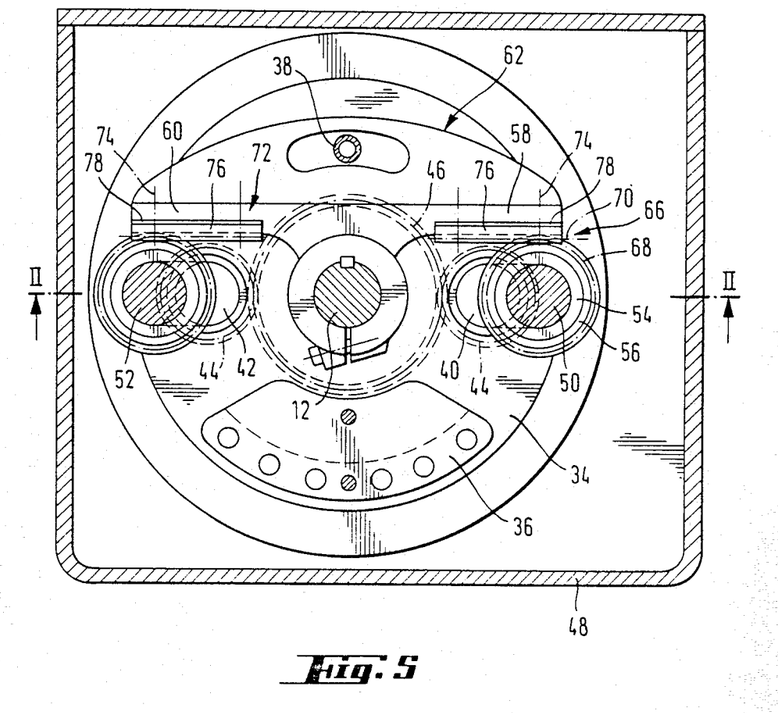
Figure 6:
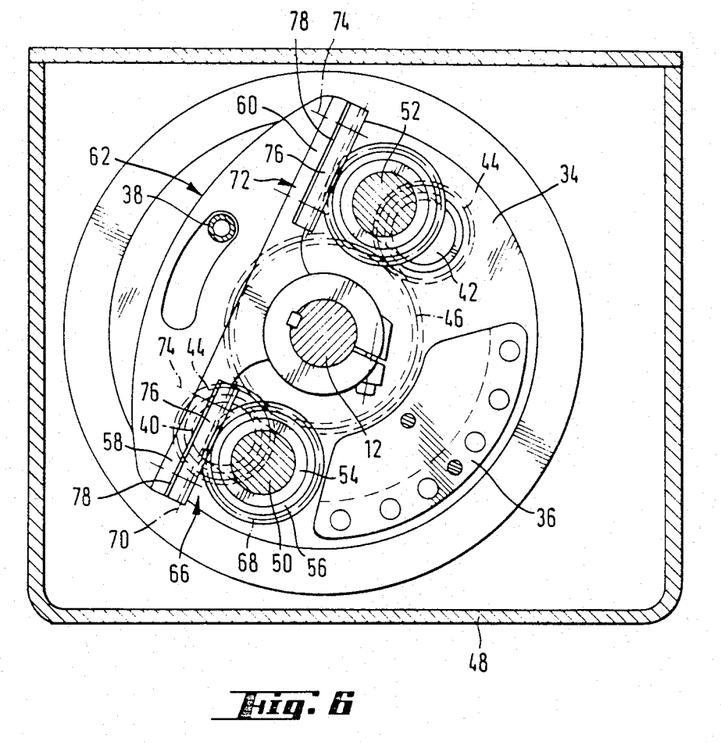
Figure 7:
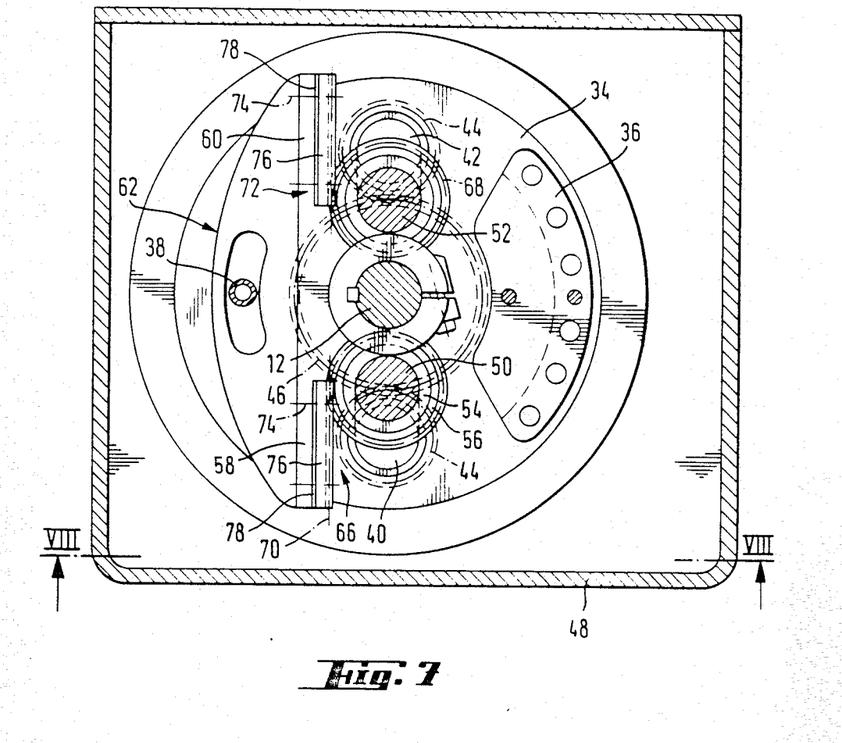
Figure 8:
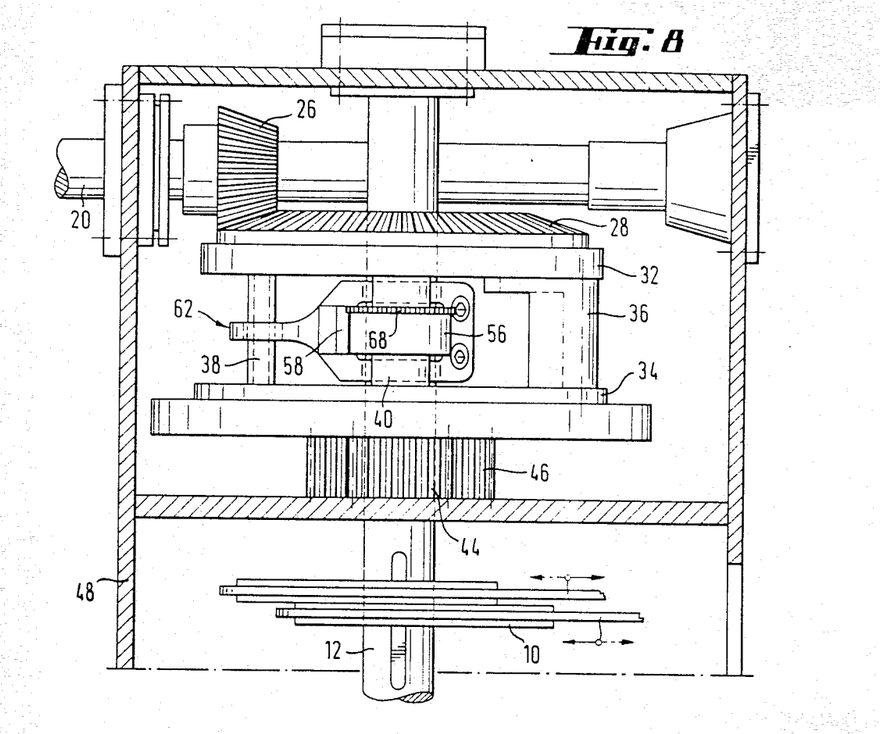
FIG. 8 is a plan view showing the gear unit according to FIG. 3 in the operating position shown in FIG. 3.
Figure 9:
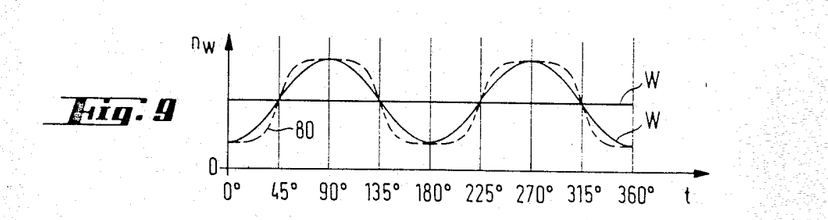
FIGS. 9 and 10 are graphs showing two angular velocities of the power takeoff shaft in relationship with the angular velocity of the drive member in accordance with a mechanism having a crank radius R.
Figure 10:
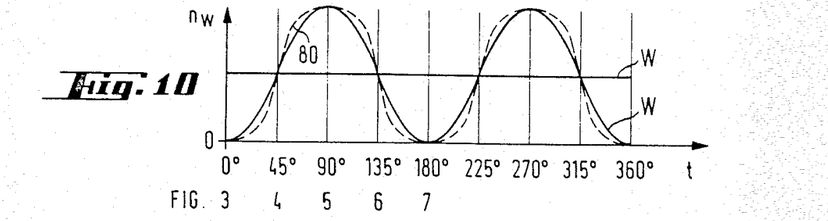

In the phase of movement of the drive mechanism 30 shown in FIG. 5, the power takeoff angular velocity leads or advances the drive angular velocity corresponding to the angular position of 90° in the diagrams of FIGS. 9 and 10. FIG. 6 shows the drive mechanism 30 in the angular position at 135° in which the angular velocity of the power takeoff shaft 12 is again equal to the angular velocity of the drive mechanism 30.

The difference between the velocity diagrams of FIGS. 9 and 10 results from the size of the crank radius R.

In the diagrams of FIGS. 9 and 10, a movement curve 80 is shown which is of a known gear unit and which is depicted in dashed line form. The cranks of the crankshaft are connected with a rocker arm by means of a coupling member in the known gear unit. A comparison of the two curves clearly shows that a more peaked progression of the movement curve in the gear unit in accordance with the invention results in the 0 area or range.

A slide block which cooperates with a running surface of the arm of the rocker 62 may be arranged at each crank. However, in accordance with a preferred construction of the invention, a bearing, and preferably a roller bearing 54, is arranged at each of the cranks 50, 52 with the bearing ring 56 rolling on the arm 58, 60 of the rocker 62. As a result of this embodiment, the friction and also wear are substantially reduced. With the bearing ring of the crank there is the danger that this bearing ring will slip through the arm during a return movement of the running surface. This is possible particularly when the gear unit is driven at high speeds.

Wear resulting from this characteristic can be avoided by a gear unit wherein the means 66 for preventing the bearing ring 56 from slipping through on the arms 58, 60 are arranged in each instance between the bearing ring 56 and the arms 58, 60 of the rocker 62. For this purpose, each of the bearing rings has a friction ring which cooperates with a friction lining on the arm. However, a substantially more advantageous construction is one wherein each of the bearing rings 56 has a toothed ring 68 which cooperates with a toothed rack 70 on the arm 58, 60.

Means preventing the bearing ring from slipping through on the arm can be arranged over a part or over the entire width of the bearing ring. However, it is preferred if they reach only over a part of the width of the bearing ring or if they are arranged at a side thereof.

In accordance with another preferred aspect of the invention, a regulating mechanism 64 is provided for adjusting the distance of the arms 58, 60 with reference to the cranks 50, 52. The regulating mechanism 74 has exchangeable packing plates or shims 78 of various thicknesses which are available between the arms 58, 60 of the rocker 62 and the running blocks 76 arranged thereon. The distance of the arms with reference to the crankshafts can thereby be simultaneously adjusted also.

The gear unit in accordance with the present invention may be employed for various purposes and uses. It is particularly advantageous when used for driving a shedding mechanism of a weaving machine particularly a ribbon weaving machine wherein it is especially advantageous if the power takeoff shaft of the gear unit is simultaneously operated as the shaft of the shedding mechanism.

Thus, it will be seen that the present invention provides a gear unit having a drive mechanism 30 which is rotatably supported on an output shaft 12 between two bearing positions 64 on the shaft 12. The drive mechanism 30 carries two crankshafts 40, 42 which are offset by 180° each of which carry planet wheels 44 which mesh with a stationary sun wheel 46. Cranks 50, 52 of the crankshafts 40, 42 cooperate with arms 58, 60 of a twin-armed rocker 62 which is non-rotatively coupled to the power takeoff shaft 12. An increase of the transmission capacity and an improvement of the extremely, simple low-wear and low-play construction of the gear unit is thereby achieved.

While a specific embodiment of the invention has been shown and described in detail to illustrate the application of the inventive principles, it will be understood that the invention may be embodied otherwise without departing from such principles.

What is claimed is:

1. A drive assembly for producing a nonuniform power output from a uniform input drive, particularly for use for a shedding mechanism of a weaving machine, comprising: a drive member having a relatively uniform power input; an output shaft driven by said drive member; a pair of crankshafts offset relative to each other by 180° connected to be driven by said drive member; a pair of journals supported at two bearing positions on said output shaft and having said crankshafts supported therein; a planet wheel mounted on each of said crankshafts; a stationary sun gear arranged with said planet wheels in meshing engagement therewith; and a twin-armed rocker member connected to be driven by said crankshaft for driving said output shaft.

2. A drive assembly according to claim 1 wherein each of said crankshafts has a crank and wherein a bearing is arranged at each of said cranks, said bearing including a bearing ring which rolls on the arms of said twin-armed rocker member.

3. A drive assembly according to claim 2 further comprising means for preventing said bearing ring from slipping through on the arms of said rocker member, said means being arranged in each instance between said bearing ring and said arms of said rocker member.

4. An assembly according to claim 3 wherein each of said bearing rings has a friction ring which cooperates with a friction lining on an arm of said rocker member.

5. An assembly according to claim 3 wherein each of said bearing rings has a toothed ring which cooperates with a toothed rack on said arms of said rocker member.

6. An assembly according to claim 1 wherein each of said crankshafts includes a crank, said assembly further comprising a regulating mechanism for adjusting the distance of the arms of said rocker member with reference to said cranks.

7. An assembly according to claim 6 wherein said regulating mechanism includes exchangeable packing shims of various thicknesses which are available between the arms of said rocker member and running blocks which are arranged thereon.

* * * * *